United States Patent [19]
Moorehead et al.

[11] Patent Number: 6,035,240
[45] Date of Patent: Mar. 7, 2000

[54] FLEXIBLE DISTRIBUTED PROCESSING SYSTEM FOR SENSOR DATA ACQUISITION AND CONTROL

[76] Inventors: Jack Moorehead, 4120 Porte De Merano, No. 80, San Diego, Calif. 92122; Howard S. Barr, 3234 Fortuna Ranch Rd., Encinitas, Calif. 92024

[21] Appl. No.: 09/190,480

[22] Filed: Nov. 12, 1998

[51] Int. Cl.[7] ............................................. G05B 19/18
[52] U.S. Cl. .............. 700/2; 700/3; 700/9; 700/47; 700/83; 709/213; 709/220; 713/201; 713/320
[58] Field of Search .................. 700/2, 3, 4, 9, 700/48, 47, 52, 83, 84, 87, 88; 709/213, 216, 220, 223, 229; 713/201, 320

[56] References Cited

U.S. PATENT DOCUMENTS

| | | | |
|---|---|---|---|
| 5,193,189 | 3/1993 | Flood et al. | 709/103 |
| 5,469,150 | 11/1995 | Sitte | 340/825.07 |
| 5,530,643 | 6/1996 | Hodorowski | 700/86 |
| 5,742,499 | 4/1998 | Reynolds | 700/2 |
| 5,764,509 | 6/1998 | Gross et al. | 700/29 |
| 5,801,942 | 9/1998 | Nixon et al. | 700/85 |
| 5,826,095 | 10/1998 | Jordon | 395/800.11 |
| 5,838,563 | 11/1998 | Dove et al. | 700/85 |
| 5,953,226 | 9/1999 | Melish et al. | 700/18 |

*Primary Examiner*—William Grant
*Assistant Examiner*—R Patel
*Attorney, Agent, or Firm*—Frank D. Gilliam

[57] ABSTRACT

An all digital physical parameter sensing network. Sensors under control of a central computer measure factors such as temperature, pressure, flow rate, filter efficiency and the like at numerous locations in a system such as a water treatment plant. Each sensor is precalibrated with voltage offset information, sensitivity variations, corrections for nonlinear behavior, etc. stored in memory at the sensor. All sensors generate corrected voltage signals conforming with the measured physical parameter, so that any sensor can be replaced without requiring recalibration. Basically, the system comprises a central computer, a communications interface between the computer and a single bus, plural sensor nodes along the bus each including a sensor for sensing a physical condition and processing the sensed information to correct for sensor individual characteristics and for transmitting the corrected sensed information to the central computer. Assembling the various sensors and their sealing engagement with their electrical connections.

9 Claims, 4 Drawing Sheets

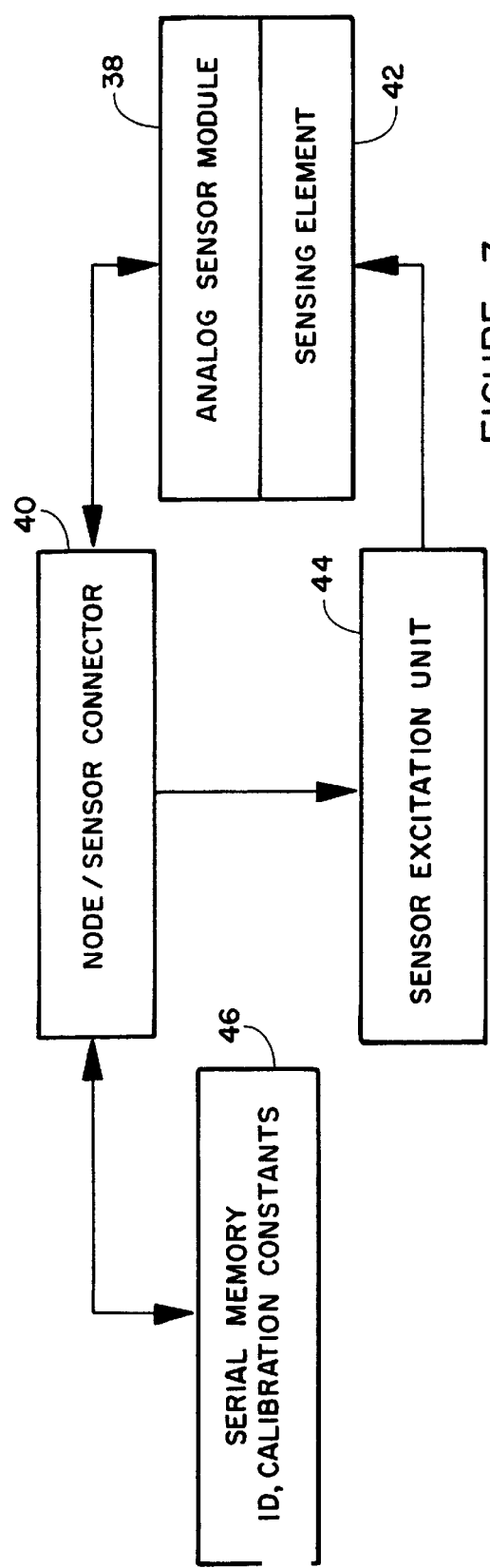
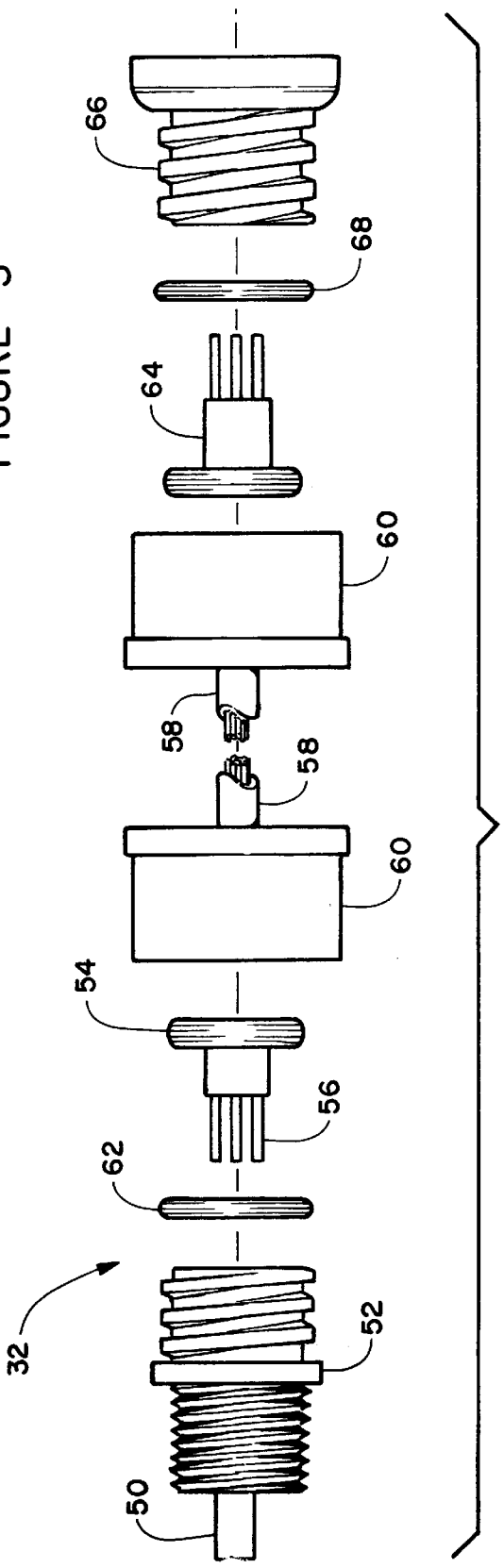

FLEXIBLE DISTRIBUTED PROCESSING SYSTEM FOR SENSOR DATA ACQUISITION AND CONTROL

FIELD OF INVENTION

This invention relates to process control systems in which information on various process parameters, such as pressure, flow rates and temperature, is collected by a number of sensors and various devices such as motors, fans, pumps and valves are controlled in response to variations in the sensed information.

BACKGROUND OF THE INVENTION

Various integrated process control systems have been designed to automate factory machinery, processes in municipal water or sewage treatment plants, commercial buildings, etc. These systems are designed to transmit a significant number of system status monitoring and process control functions for display on computer monitors, database storage and process performance reports. Continuous monitoring of various equipment and process streams is required to establish optimum operating parameters, such as determining when and how an alarm should alert operators or plant managers to changes in conditions, controlling of various equipment and process systems and the like. The objective of a process control system is to collect information on all the appropriate parameters, e.g., system or line pressures, flow, temperature and control the appropriate equipment, e.g., motors, fans, pumps and valves, to maintain the proper operating conditions or transmit an alarm signal if necessary.

One type of control system currently in use was designed to automate factory machinery. An individual stand-alone integrated Programmable Logic Controller (PLC) uses a microprocessor, sensor inputs and control outputs. The PLC processes the incoming sensor signals and transmits programmed electronic signals to the process equipment being controlled. Such PLCs can be integrated into a network linking a group of remote PLCS together to coordinate the operation of a factory production line.

Another type of control system is designed to typically monitor an entire water or sewage treatment plant or a community-wide network of mechanical or electronic devices. A common approach to plant process control uses a central master computer with specific software to monitor and control an array of module drivers inside a Remote Terminal Unit (RTU). The modules collect and transmit sensor data in the form of analog signals and in turn actuate switches, solenoids and the like to control process equipment. These modules perform simple functions in either acquiring or processing sensor data or generating the appropriate analog signal outputs using software driver codes written specifically for each individual module driver address. A supervisory control and data acquisition module array inside the RTU enclosure is connected by a serial link with a central computer.

Typically, the sensors used in these systems produce a voltage, current or change in resistance or capacitance depending on the quantity sensed, such as optical, pressure or magnetic phenomena. Where the sensors produce a voltage output, the voltage produced at different parameter levels and the sensor sensitivity in volts per unit of measured quantity may vary from sensor to sensor, particularly where the sensors are of different types or made by different manufacturers. For example, in a pressure sensing system, it may be desirable to have the sensor read 0 volts when no pressure is applied and 5 volts when 100 psi is sensed, and the sensor voltage level output should track changes in pressure. Since it is important to have all sensors in a system to "look" the same to a central control unit, conventionally the sensor circuitry is "trimmed" with potentiometers or laser trimming of resistors to correct for offsets from the desired voltage and sensitivity changes which often differ from sensor to sensor. However, such trimming may not provide precise matching, offsets may change with time, temperature etc. and with different types of sensors trimming is often not effective.

Therefore, there is a continuing need for improved process control systems for complex processes and provision for more convenient determination and application of any needed sensitivity or signal output offsets to provide improved uniformity between sensors in the system and to permit different types of sensors to be used in a sensor array.

SUMMARY OF THE INVENTION

The above-noted problems, and others, are overcome in accordance with this invention by an all-digital network sensing and control system having a central computer with appropriate software for receiving process digitized information from a plurality of nodes each including a micro controller, interface module and novel sensor arrangement and for controlling the system in response to sensed information.

The basic system comprises a central computer, a communications interface connecting the computer to a plurality of sensor nodes arranged on a two wire link in any suitable configuration, such as linear, star, etc., powered by a power supply with battery back-up.

Generic data acquisition modules at each node are capable of measuring a variety of sensor outputs. The sensors may produce a voltage, current or change in resistance or capacitance output in accordance with the quantity sensed, such as optical, pressure or magnetic phenomena. At each node, the analog sensed information is converted to a digital output signal for transmission to the central computer. The central computer will maintain records of the information received from the sensors, sound alarms when signals are outside a selected range and prepare reports of system operation.

Each sensor has the signal conditioning parameters for the particular sensor digitally encoded in a serial addressed memory on each sensor. Since sensors will vary, particularly where made by different manufactures, the memory, preferably in an Erasable Programmable Read Only Memory (EEPROM) component, may include the sensor serial number, any required voltage offset and sensitivity corrections to a standard, temperature compensation information and any correction factors for nonlinearities. Each sensor is connected to the central computer through a two wire link via a node interface which converts the sensed analog voltage signal to a digital signal and performs other functions, as detailed below.

BRIEF DESCRIPTION OF THE DRAWING

Details of the invention, and of preferred embodiments thereof, will be further understood upon reference to the drawing, wherein:

FIG. 3 is a schematic block diagram of the sensor configuration;

FIG. 4 is an exploded view of first embodiment of a sensor module.

DETAILED DESCRIPTION OF THE PREFERRED EMBODIMENTS

Figure 1:
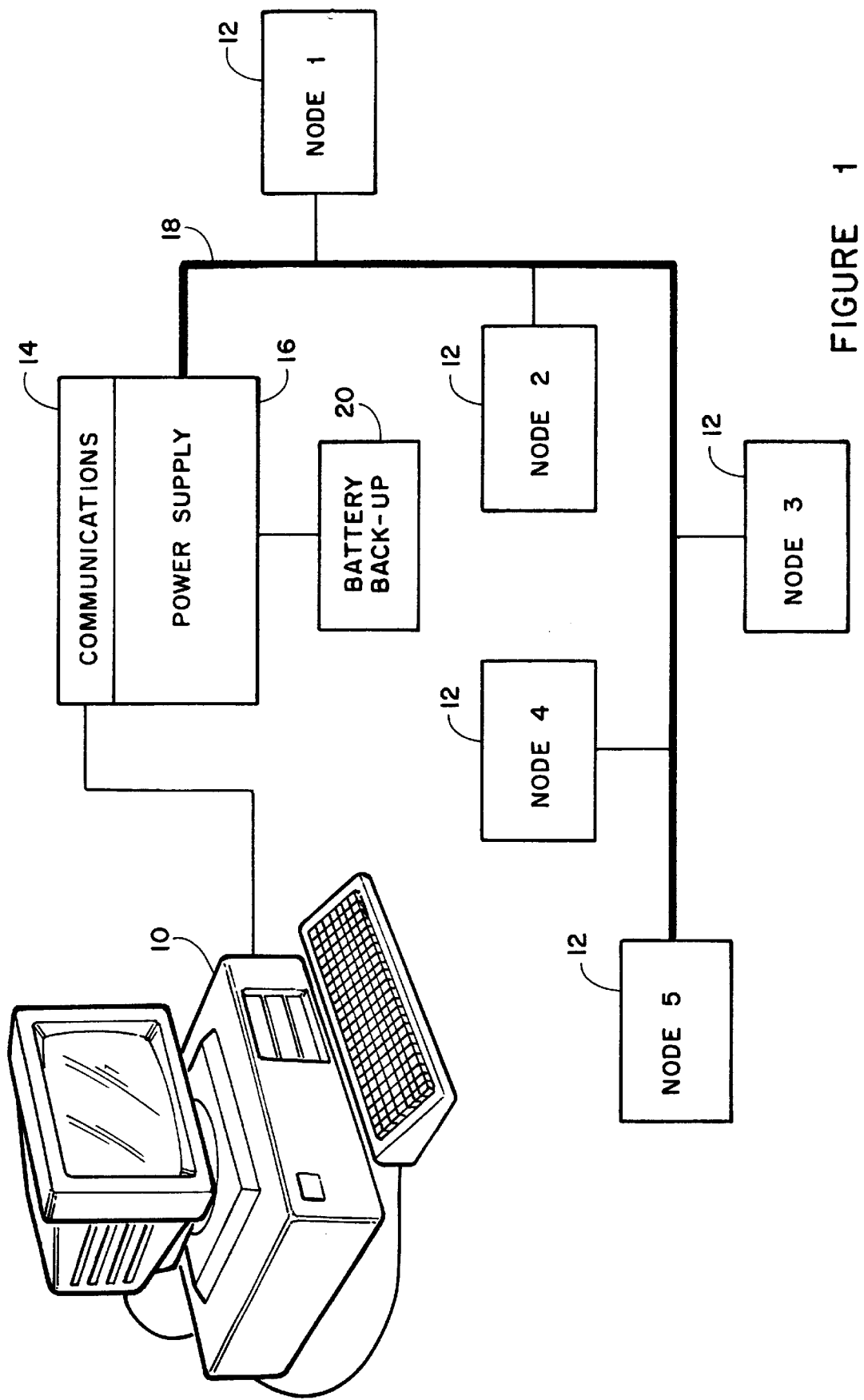
FIG. 1 is a schematic block diagram of the overall monitoring system.

Computer 10 may be any suitable computer having memory and speed selected in accordance with the number of nodes to be connected thereto and the complexity of information to be sensed. In general, a conventional so-called "PC" is fully effective. Any suitable operating software may be used with computer 10. Excellent results are obtained with LONWORKS software package from the Echelon Corporation, which includes LonManager Intellution software modules to manage the network and provide the user interface.

Computer 10 is connected to a plurality of nodes 12 via a communications interface 14, power supply 16 and a two-wire bus 18. Battery back-up 20 is preferably furnished to maintain system operation in the event of a general power failure. This is a distributed sensing, monitoring and control system rather than the usual centralized programmable logic control system that has been the standard industrial control system.

Communications interface 14 connects computer 10 to the array of nodes 12. Typically, the interface will be a network card, such as a PCNSS-10 card from the Echelon Corporation installed in computer 10, working with a LPI-10 power interface module from the Echelon Corporation. Any conventional power supply 16 and battery back-up 20 may be used such as the LPI-10 from Echelon. The interface module directly connects to the two wire network bus 18. This LPI-10 module electronically allows the communication protocol from the power and communicates with micro controllers at each node 12 to support the communication protocol on the bus. The network card generates an "unpowered" protocol that then, in combination with the power interface module, places the protocol on the DC powered two wire network by transformer coupling the protocol onto DC power supply 16. The intra-node operation constitutes a second layer of communication, as described below.

The two-wire bus 18 may have any suitable configuration, such as linear as seen in FIG. 1, a "star" arrangement, a loop arrangement, etc.

Computer 10 acts as a central command post, generating requests for data from sensors at nodes 12, or generating signals to turn machines including the devices at the nodes on and off.

Figure 2:
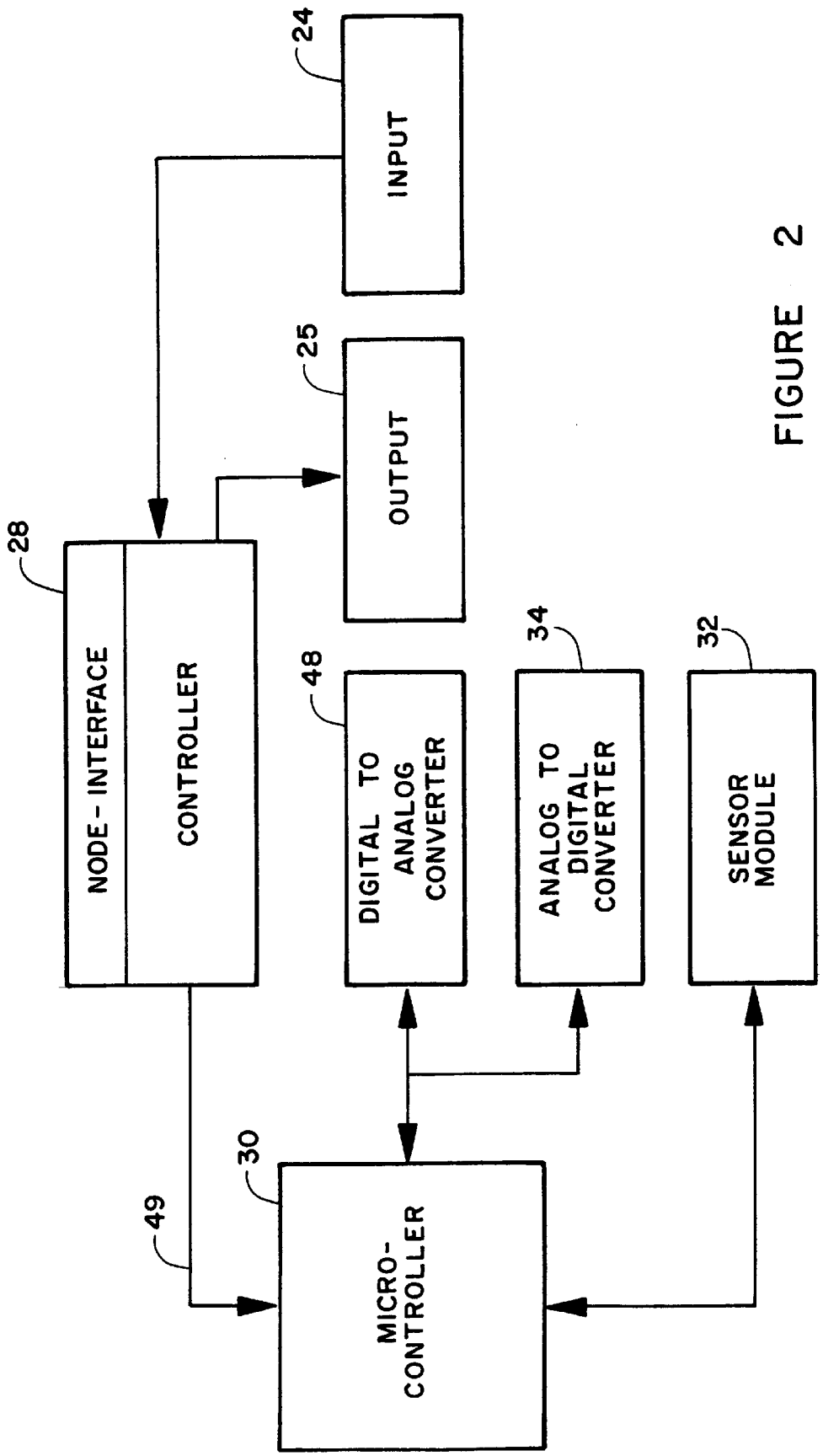
FIG. 2 is a block diagram of the configuration of each node.

FIG. 2 schematically shows the components, in block diagram form, included at each node 12. Input 24 from, and output 25 to, computer 10 via bus 18, such as requests for sensor information, are directed to a micro controller 26 via a node interface module, typically a LPT-10 from Echelon. Commands from central computer 10, which seek to set certain bits as outputs, or check certain bits as inputs, can be received by controller 26 and executed directly on the input/output lines of controller 26 directly. Optical isolation on the input signals from input 24 is achieved using a standard logic output optocoupler such as the OT Optoelectronics H11L1 and make up the output module 25. Module 25 is capable of switching both AC and DC signals and can be used to power other switches or relays or provide optically coupled digital signals to other circuits.

Interface module 28 separates the communication protocol and data from the DC power present online 18 and typically generates 5 volts at 100 ma for use at the node. Interface module 28 is capable of communicating with each individual node 12 and computer 10.

Controller 26, typically a Neurons micro controller, typically a MC3150 or MC3120 from Motorola or an TMPN3150 or TMPN3120 from Toshiba executes either data read or control write commands at each node via the node interface 28. Controller 26 includes three separate micro controllers in one package. One controller arbitrates the communication protocol. The second micro controller controls internal memory. The third micro controller acts as a process controller for collecting and controlling data. This third micro controller is the processor that communicates intra-node and provides a node application program. Typically this third micro controller may be configured to work with a number of different devices, processing simple input or output bits, synchronous communication ports, asynchronous communication ports and programmable timers and counters. Nodes 12 will be processing multiple input signals from computer 10 and a variety of different sensors, being either digital or analog signals. In the case of analog signals processing numerous corrections is required. Thus, an interceding micro controller 30, typically a MC68HC711DB from Motorola, is placed between the analog signal data collection hardware at sensor module 32 and controller 26. A direct digital input/output signal is received by controller 26 from micro controller 30 for direct communication to bus 18. Analog signals from sensors are converted to digital signals by an analog to digital converter 34 and passed to controller 26. Digital signals from controller 26 are converted to analog signals by digital to analog converter 36 for transmission to sensors 32 where necessary.

Typical digital inputs may be a mechanical switch closing, AC power detection, optical switch detection, thermal controller relay output, etc. Digital controls could include turning a pump on or off, closing a relay or switch, etc. An analog interface may be required to process information from a galvanic oxygen sensor, differential pressure sensor, strain gauge, chemical monitor, analog optical sensor or the like FIG. 3 schematically shows the sensor configuration elements. A connector 40 connects the sensor module to micro controller 30. Sensing element 42 senses physical characteristics such as temperature, pressure, flow rates and the like. Calibration constants, offsets, sensitivity adjustments, etc as detailed below are stored in serial memory 46, typically a 24C02 or 24C04 from Microchip, Inc.

The data flow paths for analog sensor inputs are complex. For any analog type sensor, whether it is piezoresistive, capacitive, magneto resistive or otherwise, sensor operation is basically similar. First sensing element 42 is excited by sensor excitation unit 44. Sensor excitation is typically a current or voltage source, depending upon the type of sensing element 42 used. Sensing element 42 then varies according to the physical phenomena (optical radiation, pressure, magnetic, etc) induced on the sensor. The output voltage of the sensor then varies as the physical phenomena does and is followed by the analog signal processing circuitry at the analog sensor module 38. DC offset may be applied to the process signal via digital to analog converter 48, such as a Linear Technology LT1458. This serves to bias the output signal of analog sensor module 38 to within the dynamic range of multiple input analog to digital converter 34, such as an 8-input Linear Technology 1598.

From analog sensor module 38, the signal goes to analog to digital converter 34 for conversion. Micro controller 30 selects the appropriate channel on the multiplexer of converter 34 and performs the conversion. The 12-bit converted value is the processed value of sensing element 42, which may require compensation and correction. Once the correction is performed on the data in micro controller 30, the corrected data can be transmitted to controller 26 via an asynchronous serial data link 49. After receiving the data, controller 26 can transmit the data on bus 18 via a node interface 28 to the main computer 10.

Micro controller 30 also includes frequency or pulse width measuring capability. This allows the use of a frequency modulated sensor, such as inductive paddle wheel flow sensors, at sensor modules 32. Here, a sinusoidal signal, which varies in frequency and amplitude with flow, is converted to a square-wave by using standard voltage comparators, such as a Maxim MAX995, in a "zero-crossing" configuration. The period of the frequency modulated digital signal is measured, indicating rotational speed of the paddle wheel in accordance with fluid flow in a pipe. to this example, the signal processing electronics in analog sensor module 38 is the "zero-crossing" comparator circuit. While no excitation is required, calibration and correction coefficients (are stored in serial EEPROM memory 46). Corrected pulse width data are transmitted to controller 26 for transfer to main computer 10 via bus 18.

This configuration can also generate analog output signals. Since digital to analog converter 48 is available to a sensor connector, an analog signal can be amplified directly by a common operational amplifier, such as a Burr-Brown OP-27, or an optically or capacitively isolated by an isolation amplifier such as a Burr-Brown ISO100 or Burr-Brown 1S0164, respectively, at sensor module 32. In this way an analog signal can be driven by controller 30 and digital to analog converter 46.

Each sensing assembly includes a sensor 42 and an analog sensor module 38. Analog module 32 conditions, digitizes and corrects the sensor signals and generates the appropriate result for data transmission. The main controller in analog module 32 may typically be a Motorola MC68hC711D3, which comprises a single chip processor including 4K Byte EPROM, 192 Byte RAM, synchronous serial port SPI, an asynchronous serial port SCI and two 8-bit parallel ports for general purpose input/output and 4-pulse width measuring input pulse capture circuits.

Sensor units 38 are each of the voltage-output type, generating a processed voltage output regardless of the physical phenomena being sensed. As discussed above, voltage and sensitivity of off the shelf sensors for sensing different phenomena, especially sensors from different manufacturers, will vary. The necessary voltage offset and sensitivity adjustments are calibrated prior to installation in a system, preferably at the factory. These offsets and adjustments, together with any other desired information such as serial number, date tested, service date, sensor type, sensitivity, offset, temperature behavior of offset, temperature behavior of sensitivity, nonlinear behavior (output vs. input), other environmental behaviors of sensor, sensor location or configuration, etc. are stored in an EEPROM on the sensor. Thus, any sensor can be replaced with another and generate correct signals.

The use of the EEPROM 46 provides another unique feature for the system. Since all the serial memories at a particular node are linked to micro controller 30 via an $1^2C$ standard link configuration the presence of a memory, and thus a particular sensor, can be verified by controller 30. This is achieved by using a common $1^2C$ SCL data line for all memories, and a data selector such as a Motorola MC74HC4051, by selecting one of a number of SDA lines to verify presence of the memory at the appropriate location. First the controller 30 selects a particular SDA line by selecting a particular address on the 74HC4051. An appropriate $1^2C$ command is broadcast on the bus. Only the memory located at a particular connector 40 should respond with its connector corresponding to the address selected by controller 30. If the memory responds with the appropriate connector address, then controller 30 has verified that the correct memory is located at the correct connector. If not, a configuration error is detected by controller 30, an error message can be sent to controller 28, then transferred to the controlling computer 10 via bus 18. This arrangement assures correct configuration of all sensors when attached to an analog processing node as shown in FIG. 2. Furthermore, all other information regarding the sensor (serial number, dated of manufacture, etc.) can be assured to be correct.

As mentioned above, the serial memory also provides the capability of providing controller 30 with any appropriate correction coefficients required to correct the raw sensor output for offset, gain or environmental effects, e.g. temperature changes. Thus non-linear multi parameter functions can be used to correct raw sensor inputs, if necessary. For example, if a sensor's output is a non-linear function of its output voltage, and that output voltage can change non-linearly as a function of temperature, which is measured as an output voltage of a second sensor, then a series of coefficients can be generated that can allow correction of the raw sensor value, using a suitable mathematical algorithm. All of the correction coefficients can be stored in serial memory 46. Serial data will indicate the number of parameters, which other sensor outputs relate to the sensor to be corrected and the number of coefficients involved. Thus, multi-parameter nonlinear behaviors can be corrected. In turn, the physical phenomena being measured can have a value returned to central processor 10 which is corrected and within the measurement requirements.

A sensor module 32 is shown in exploded view in FIG. 4. The sensor element 50, which senses any desired physical phenomena such as pressure, temperature, flow etc., extends from threaded housing 52 which contains sensor electronic components. Sensor 50 may be a rotatable "paddle wheel" sensor for sensing fluid flow in a pipe. Housing 52 threads into a corresponding opening a pipe or other structure.

An electrical plug 54, having a suitable number of pins 56 connected to cable 58 is plugged into the electronics (not seen) within housing 52. A lock ring clamp 60 threads over threads 62 on housing 52 to hold plug 54 in place. An O-ring 62 is provided between lock ring clamp 60 and housing 52. A plug 64 at the distal end of cable 58 plugs into a node plug port 66 which connects to bus 18, typically through an intermediate manifold. Another lock clamp ring 60 holds plug 64 in place within port 66, with an O-ring 68 therebetween.

Figure 5:
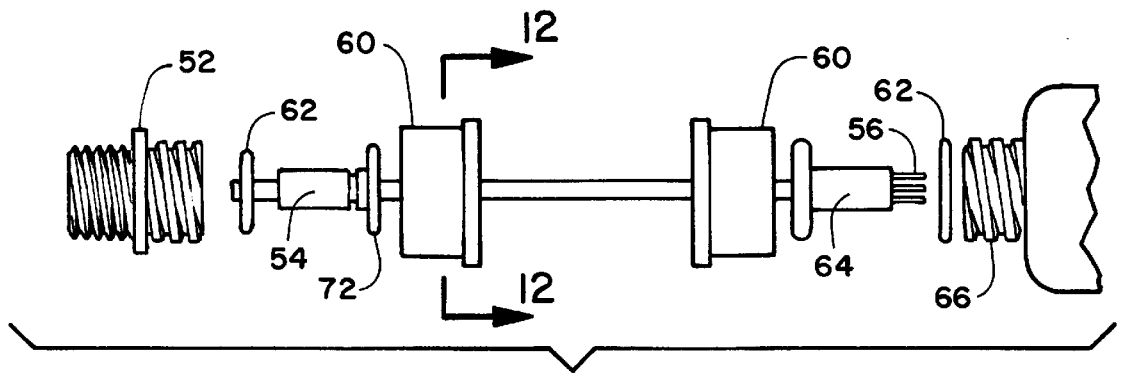
FIG. 5 is an exploded view of second embodiment of a sensor module.
Figure 6:
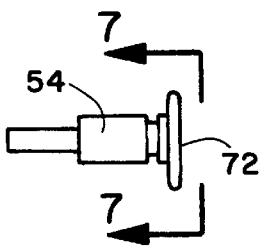
FIG. 6 is a side view showing of a sensor housing.
Figure 7:
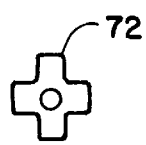
FIG. 7 is an end view of FIG. 6.
Figure 8:
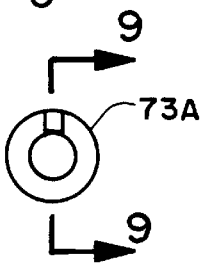
FIG. 8 is a front view showing of a sealing plate.
Figure 9:
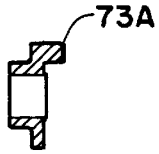
FIG. 9 is a cutaway showing of the sealing pklate of FIG. 8 taken along line 9—9 of FIG. 8.
Figure 10:
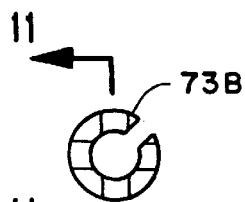
FIG. 10 is a front view showing of a ring washer.
Figure 11:
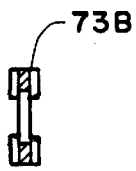
FIG. 11 is a cutaway showing of the ring washer of FIG. 10 taken along line 11—11.
Figure 12:
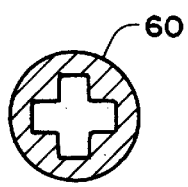
FIG. 12 is a showing of the inside configuration of the lock ring clamp tqaken along line 12—12 of FIG. 5.

Referring now to drawing FIGS. 5–12, drawing FIG. 5 is similar to drawing FIG. 4 except that the sensor housing 64A has an end 72 differently configured than end 54 of housing 64. The end 72 of sensor housing 54 has a cruciform configuration, see drawing FIG. 7, that mates with the lock ring clamp 60 having the configuration shown in drawing FIG. 12. Positioned between the end 72 and the lock ring clamp 60 is a combination seal plate 73 that includes elements 73A and 73B. Element 73A is a washer having a side configuration shown in FIG. 8 taken along line 9—9 of FIG. 8 as shown in FIG. 7. The element 73A meshes with element 73B to form a seal plate 73 between 72 and 60. A side view of 73 B taken along line 11—11 of FIG. 10 is shown in FIG. 11. The end mating surface lock ring clamp 60 is shown in FIG. 12 taken along line 12—12 of FIG. 5. The cruciform configuration of the end of the lock clamp 60 allows the installer to slip the lock ring clamp over the sensor device, and seal plate 73, to clamp the sensor into the lock clamp 60. This feature eliminates having to pre-assemble harness and lock ring clamping caps at the first point of assembly and can be accomplished at location of use. The seal plate and lock ring clamp form a continual O-ring sealing surface when applying clamping pressure with the lock ring clamping nut.

Figure 13:
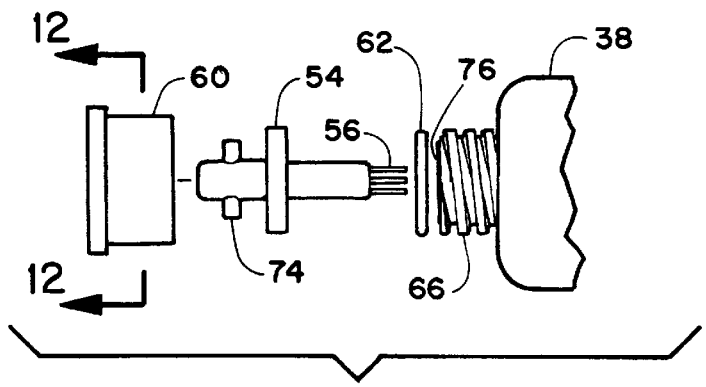
FIG. 13 is an exploded view of third embodiment of a sensor module.

FIG. 13 is similar to the assembly of drawing FIGS. 4 and 5 except a pin 74 positioned normal to the longitudinal center line of the sensor assembly. This pin nests within the inner cruciform configuration of lock ring clamp 60. The lock ring clamp 60 can be tightened on the threads 66 to form a seal against the front surface 76 of threads 66.

This sensor is simple, sturdy and is adaptable to measuring a wide variety of parameters with different sensor elements 50 and associated electronic components as detailed above. While certain specific relationships, materials and other parameters have been detailed in the above description of preferred embodiments, those can be varied, where suitable, with similar results. Other applications, variation and ramifications of the present invention will occur to those skilled in the art upon reading the present disclosure. Those are intended to be included within the scope of this invention as defined in the appended claims.

We claim:

1. A flexible distributed processing system for sensor data acquisition and control which comprises:

a central computer;

communications means for transmitting to said central computer and receiving signals from said central computer;

a plurality of spaced sensor nodes;

a bus connecting all of said sensor nodes to said communication means;

a power supply for directing a predetermined voltage into said bus;

each of said nodes including sensor means for measuring a predetermined parameter and for generating a voltage signal corresponding to said parameter;

correction means at each sensor means for storing corrections between said voltage signal and standard output voltages and between sensor sensitivity and standard sensitivity; and means for correcting said voltage signal in accordance with said stored corrections; and means for storing and applying correction coefficients for a plurality of non-linear sensor outputs resulting from offset, gain and environmental effects.

2. The system according to claim 1 wherein said correction means comprises an erasable programmable read only memory.

3. The system according to claim 1 wherein each node includes means for converting analog signals from said sensor to digital signals for transmission to said computer and means for converting digital control signals from said computer to analog signals to said sensor.

4. The system according to claim 1 wherein each node includes means for accessibly storing identification information and calibration contacts for an associated sensor.

5. The system according to claim 1 wherein each of said sensors includes a housing threadably mountable on a structure having varying parameters to be sensed, a sensor element extending from said housing into said structure, means for connecting a proximal end of a cable to said housing and means for connecting a distal end of said cable to said bus.

6. A flexible distributed processing system for sensor data acquisition and control which comprises:

a multi-sensor system for sensing varying physical parameters wherein each sensor measures a parameter and produces a corresponding output voltage;

means for measuring sensor output voltages for a range of predetermined input parameter levels for a replacement sensor in said multi-sensor system;

means for determining variations between said measured output voltages and standard output voltages for said range of predetermined input parameter level:

applying offset voltages to said sensor output voltages to match said standard output voltages;

means for measuring sensor output sensitivity in volts per units of said input parameter for a replacement sensor in said multi-sensor system over a predetermined range of sensor output voltages;

means for determining variation of said measured sensitivity relative to a standard sensitivity for a standard sensor in said system over said range of sensor output voltages and means for applying offset voltages to said sensor output voltages to match said standard sensitivity, whereby the replacement sensor will operate precisely like an original sensor that has been replaced by said replacement sensor in the sensor system; and means for storing and applying correction coefficients for a plurality of non-linear sensor outputs resulting from offset, gain and environmental effects.

7. The system according to claim 6 including erasable programmable read only memory means for storing said offset voltages.

8. The system according to claim 6 wherein each node includes means for accessibly storing identification information and calibration contacts for an associated sensor.

9. The system according to claim 6 wherein each of said sensors includes a housing threadably mountable on a structure having varying parameters to be sensed, a sensor element extending from said housing into said structure, means for connecting a proximal end of a cable to said housing and means for connecting a distal end of said cable to said bus.

* * * * *